Sept. 11, 1923.  E. G. STRONG  1,467,341

INDICATING GAUGE

Filed Jan. 21, 1922

Ernest G. Strong, Inventor his Attorneys.

Patented Sept. 11, 1923.

1,467,341

UNITED STATES PATENT OFFICE.

ERNEST G. STRONG, OF CANTON, OHIO, ASSIGNOR TO THE TIMKEN ROLLER BEARING COMPANY, OF CANTON, OHIO, A CORPORATION OF OHIO.

INDICATING GAUGE.

Application filed January 21, 1922. Serial No. 530,777.

*To all whom it may concern:*

Be it known that I, ERNEST G. STRONG, a citizen of the United States, resident of the city of Canton, county of Stark, and State of Ohio, have invented a certain new and useful Improvement in Indicating Gauges, of which the following is a specification.

My invention relates to devices for gauging the diameter of inner or outer surfaces of work while mounted in a lathe or other machine. It has for its principal object to produce a device that will continuously indicate either the inner or outer diameter of the work as it progresses, and will dispense wholly with the use of plug gauges of the kind ordinarily used for indicating diameters of the work. The invention consists principally in a device adapted to be mounted in a predetermined relation to the axis of the lathe or other spindle and provided with a stylus that bears against the surface of the work and is connected by a multiplying system with a suitable indicating device. It also consists in the combinations and arrangements of parts hereinafter described and claimed.

Figure 1:
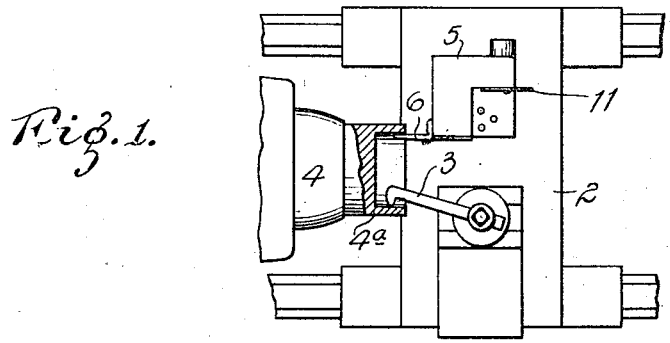
Figure 2:
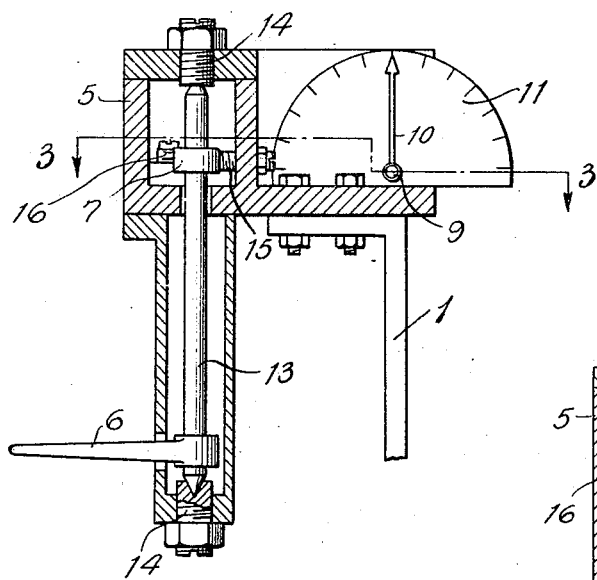
Figure 3:
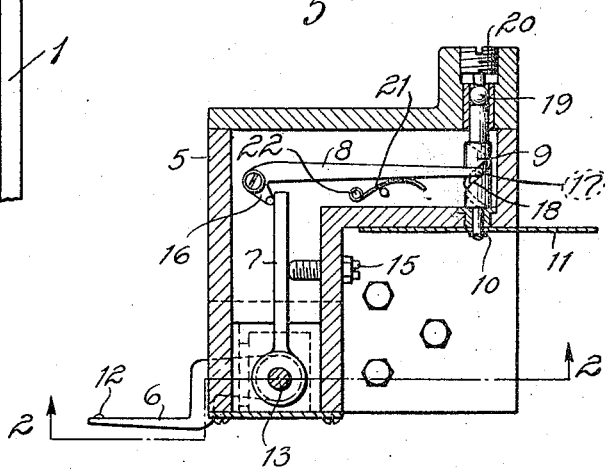

In the accompanying drawing, wherein like reference numerals refer to like parts wherever they occur, Fig. 1 is a plan view of a portion of a lathe provided with an indicating gauge embodying my invention;

Fig. 2 is an enlarged vertical view of the gauge, which is shown partly in section and partly in side elevation; and Fig. 3 is a horizontal section through the gauge on the line 3—3 in Fig. 2.

My device is adapted for use in connection with such machines as lathes, grinding machines, boring machines, screw machines, and the like, wherein the work is centered in axial alinement with the head and tail stocks, centers, boring tool or the like. For this purpose, the device may be attached to a stationary part of the machine or to a moving part thereof to provide for relative movement of the gauge and the work.

Referring to Fig. 1 of the accompanying drawings, my device is shown mounted on a bracket 1 secured to the reciprocable tool slide 2 of a single spindle lathe in close proximity to a boring tool 3, which is shown in engagement with the work 4ª which is chucked within the work holding spindle 4 of the lathe. My device comprises an upright frame-work or housing 5 in which is mounted a multiplying system comprising a pair of rock-arms 6 and 7 and a lever 8, which cooperates with a shaft or arbor 9. This arbor is provided with an indicating hand or finger 10, back of which is a stationary dial 11 marked with suitable graduations and preferably disposed vertically in position to be easily read by the operator of the machine. The dial is preferably graduated in two directions from the normal or zero point, which preferably corresponds with the vertical position of the indicating pointer which position in turn corresponds with the diameter required for the finished work.

The initial rock-arm or stylus 6, which projects from the casing, is provided with a rounded diamond or platinum point 12 near its outer end and in position to bear against the work. This initial rock-arm or stylus 6 is off-set or Z-shaped and is mounted on the lower portion of a pillar or staff 13, on the upper portion of which is mounted a second rock-arm 7 which extends at right angles to the initial rock-arm or stylus 6. The upper and lower ends of the pillar or staff are preferably coned and hardened and are mounted in counter sinks in the ends of screws 14 that are vertically adjustable in threaded holes provided therefor in the top and bottom of the casing 5. For the purpose of determining the graduation reached by the pointer for work of different diameters, the casing is provided, opposite the rock-arm 7, with a horizontally threaded hole in which works an adjusting screw 15. Opposite the free end of the rock-arm 7 and in position to cooperate therewith is the short arm 16 of a horizontally disposed lever 8, on the end of whose long arm is a laterally projecting pin 17. This pin is slidably mounted in a helical flute or groove 18 provided therefor in the horizontally disposed shaft or arbor 9 whose ends are rotatably mounted in bushings provided therefor in the casing. The front end of the shaft projects beyond its bushing and is provided with the indicating pointer or arm 10, which is positioned in front of the stationary dial 11. The rear end of the shaft 9 terminates inside of its bushing, in the end of which is an antifriction ball 19, which bears against the end of the shaft and is held in position by a threaded nut 20 which works in a threaded bore provided therefor in the housing or in a piece mounted on the housing. The housing is provided with a spring that tends to restore the indicating arm to its normal position. A suitable spring for this purpose is a flat spring 21 mounted on a stud 22 on the housing and adapted to bear against the long arm of the lever 8.

The indicating gauge above described is adapted to be mounted on the frame-work of a boring machine, screw machine, lathe or the like with the end portion of its stylus or initial rock-arm extending more or less nearly parallel with the axis of rotation of the work. When the work is being gaged for the interior diameter, the stylus is disposed inside of the bore of the work and with its rounded diamond or platinum point bearing outwardly against the inner surface of the work. For ordinary work, the stylus should be disposed to bear against the work at a point more or less nearly diametrically opposite the boring tool, although it may be located elsewhere, provided there is adequate space for it. In case the outer surface of the work is to be gaged, the stylus is arranged to bear inwardly against it.

The operation of the device is as follows: A master form having the desired diameter is mounted on the work holding spindle and the stylus arm 12 brought into contact with the surface of the master form by manipulating the adjusting screw 15, which bears against the rock-arm 7. The graduation at which the pointer stops is then noted, after which the master form is removed. After noting the graduations at which the pointer stops when initially setting the gauge by means of a set of master forms of different diameter, a record of these points may be kept and the gauge again set, without the use of master forms, for work of different diameters by the adjusting screw 15 to move the pointer to the graduation on the dial that indicates that the stylus is in the desired position for the diameter required for the finished surface of the work. Thus by the use of the locating screw 15, the device is so set that the pointer is opposite the previously noted graduation on the dial scale when the face of the rounded diamond is at exactly the distance from the axis of rotation of the work that is required for the finished surface of the work. The gauge is preferably mounted to slide parallel with the axis of rotation of the work, or else the work itself is arranged to slide axially, so as to bring the stylus in position to bear against the inner or outer surface of the work, as the case may be. Throughout the operation of the machine, whether turning, boring, grinding or the like, the rounded diamond maintains its contact with the surface of the work; and as the position of the diamond changes, in following the surface of the work, its change of position, and consequently the progress of the work, is indicated on the dial by the pointer, to which the motion of the diamond is transmitted through the multiplying system. Thus, with the dial conveniently mounted opposite the workman, he is kept continuously advised of the progress of the work and can stop the machine at exactly the stage desired.

Among the great advantages of my indicating gauge are the following: It enables the work to be turned out economically and with great precision, for, by maintaining a continuous visible indication of the progress of the work, it dispenses wholly with the use of plug gauges that are now ordinarily relied on and which are manually applied to the work at intervals. The use of such plug gauges not only involves considerable expense on account of the cost of making and maintaining them sufficiently precise for their work but also involves considerable expense for labor in applying them. Besides, even though the plug gauges may be accurately made, their use is liable to involve more or less loss of product partly on account of their intermittent application to the work and partly on account of personal factors that affect the workmen.

What I claim is:

1. The combination with a lathe or similar machine, of a gauge for indicating diameter of the work, said gauge having a stylus in position to bear against the work, a pointer, a multiplying system for transmitting motion from the stylus to the pointer, and adjustable means cooperating with said multiplying system for stopping said pointer in a predetermined position which will indicate that the gauge as set for work of a given size.

2. The combination with a lathe or similar machine, of a gauge for indicating diameter of the work, means for providing relative movement of the gauge and the work, said gauge having a stylus in position to bear against the work, a pointer, a multiplying system for transmitting motion from the stylus to the pointer, and adjustable means cooperating with said multiplying system for stopping said pointer in a predetermined position which will indicate that the gauge is set for work of a given size.

3. The combination with a lathe or similar machine, of a gauge for indicating diameter of the work, an indicating device having a rotary shaft, a multiplying system including an initial rock-arm in position to bear against the work and a final lever in position to engage the shaft of said indicating device, said shaft having a helical groove formed therein adapted to be slidably engaged by said final lever, means yieldably engaging one of said members of said multiplying system for restoring said indicating device to its normal position, and adjustable means engaging one of said members of said multiplying system for setting the indicating device in a desired position.

Signed at Canton, Ohio, this 17th day of January, 1922.

ERNEST G. STRONG.